_United States Patent Office_

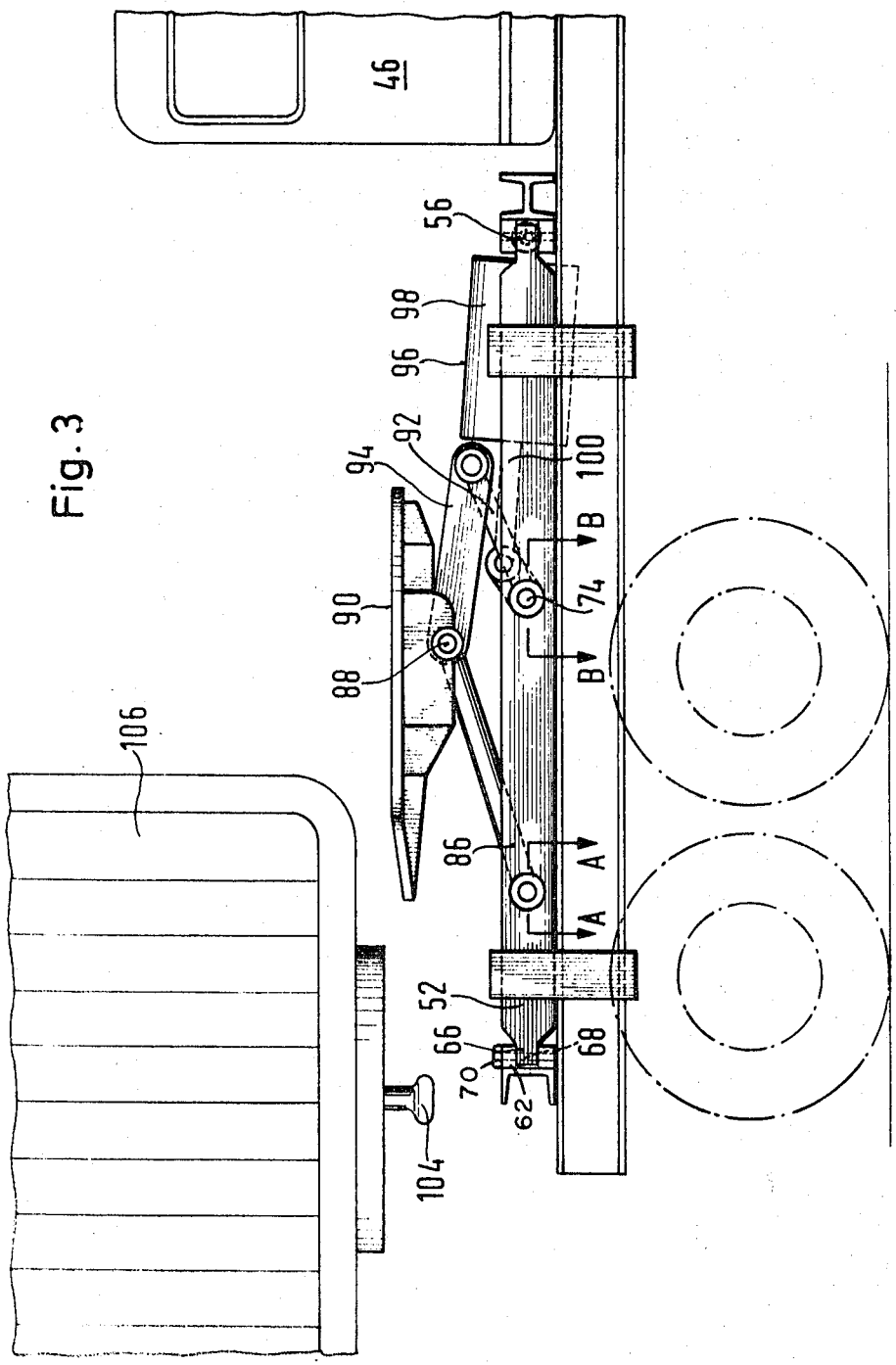

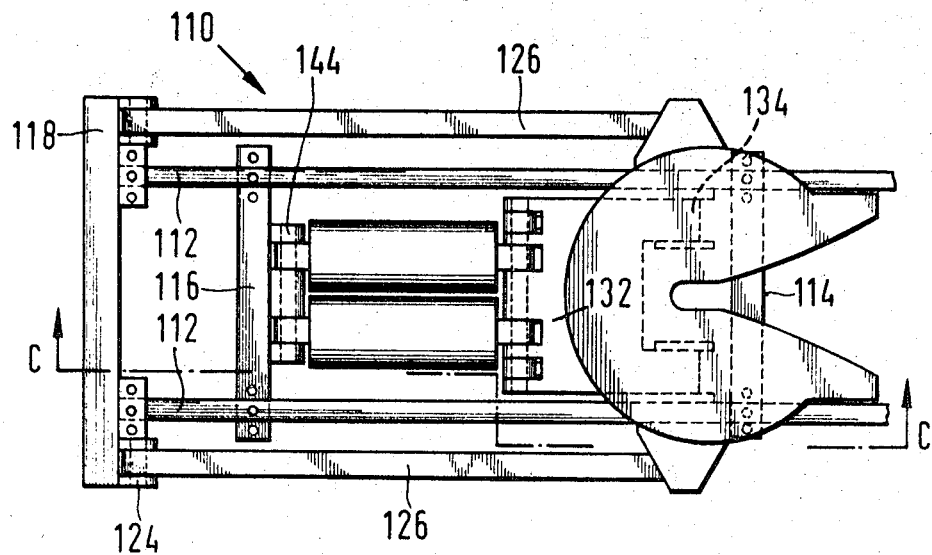
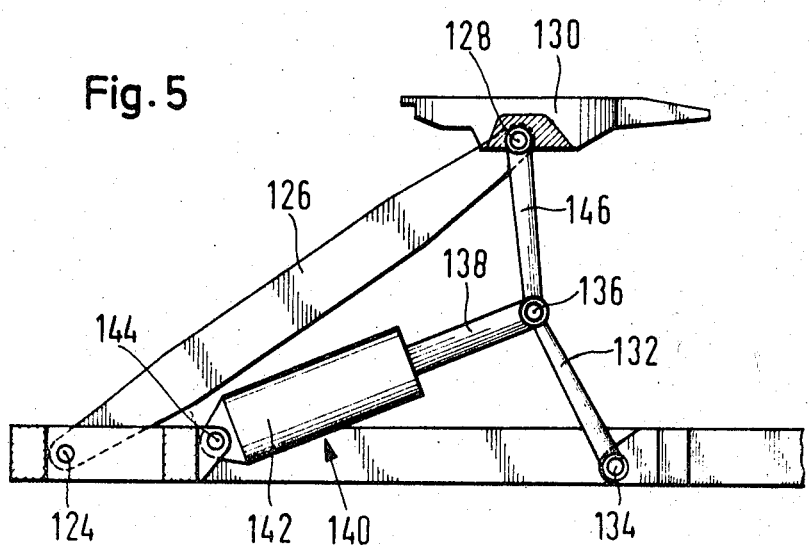

3,552,774
Patented Jan. 5, 1971

3,552,774
FIFTH WHEEL UNIT
Horst Gottler, Munich, Germany, assignor to Johann Rockinger Spezialfabrik fur Anhanger-Kupplungen, Munich, Germany
Filed May 12, 1969, Ser. No. 825,130
Claims priority, application Germany, May 16, 1968, 1,755,502
Int. Cl. B62d 53/06
U.S. Cl. 280—425        8 Claims

ABSTRACT OF THE DISCLOSURE

A fifth wheel unit for mounting a fifth wheel to a semitrailer truck. The fifth wheel is mounted on a frame. The frame consists of at least two longitudinal support members and at least two transverse connection members. Connecting means connect said longitudinal support members and said transverse members. The connection means are so constructed that the distance of the longitudinal support members from one another can be varied.

BACKGROUND OF THE INVENTION

This invention relates to a fifth wheel unit for semitrailer trucks. With semitrailer trucks it is frequently desired to have a fifth wheel which is adjustable in its height with respect to the surface on which the semitrailer truck is rolling so as to adapt the height of the fifth wheel to varying heights of a trailer to be combined with the semitrailer truck. When providing a fifth wheel which is adjustable in height it is usual to provide this fifth wheel as a part of a fifth wheel unit which comprises guide means and lifting means for lifting said fifth wheel. It is desired to mount these fifth wheel units to different types of semitrailer trucks. With different types of semitrailer trucks there are varying distances between the supporting beams to which the frame of the fifth wheel unit is to be mounted.

The object of this invention is to provide a fifth wheel unit which can be used for different semitrailer trucks having varying distances between the supporting beams.

SUMMARY OF THE INVENTION

With this object and others in view as will hereinafter become apparent, the invention provides a fifth wheel unit having a basic frame, a fifth wheel mounted on said basic frame so as to be adjustable in height with respect to the basic frame. The basic frame consists of at least two longitudinal support members and at least two transverse members connecting said longitudinal support members. The connecting means between the longitudinal support members and the transverse members are adjustable so that the distance of the longitudinal support members can be adapted to the spacing of the longitudinal supporting beams in different types of semitrailer trucks.

When the basic frame comprises bearing means for mounting shafts of a lifting mechanism supporting the fifth wheel on the basic frame the bearing means can also be adjusted along the mounting shafts.

Other features and many of the attendant advantages of this invention will be apparent by reference to the following detailed description which is illustrated by the attached drawings.

BRIEF DESCRIPTION OF THE DRAWINGS

In the drawings:
FIG. 3 shows a side elevational view of the fifth wheel unit of FIG. 2,
FIG. 4 shows a plan view of a second embodiment of the invention,
FIG. 5 shows a side elevational view partially in section on the line C—C of the embodiment of FIG. 4.

DETAILED DESCRIPTION OF THE PREFERRED EMBODIMENT

Figure 1:
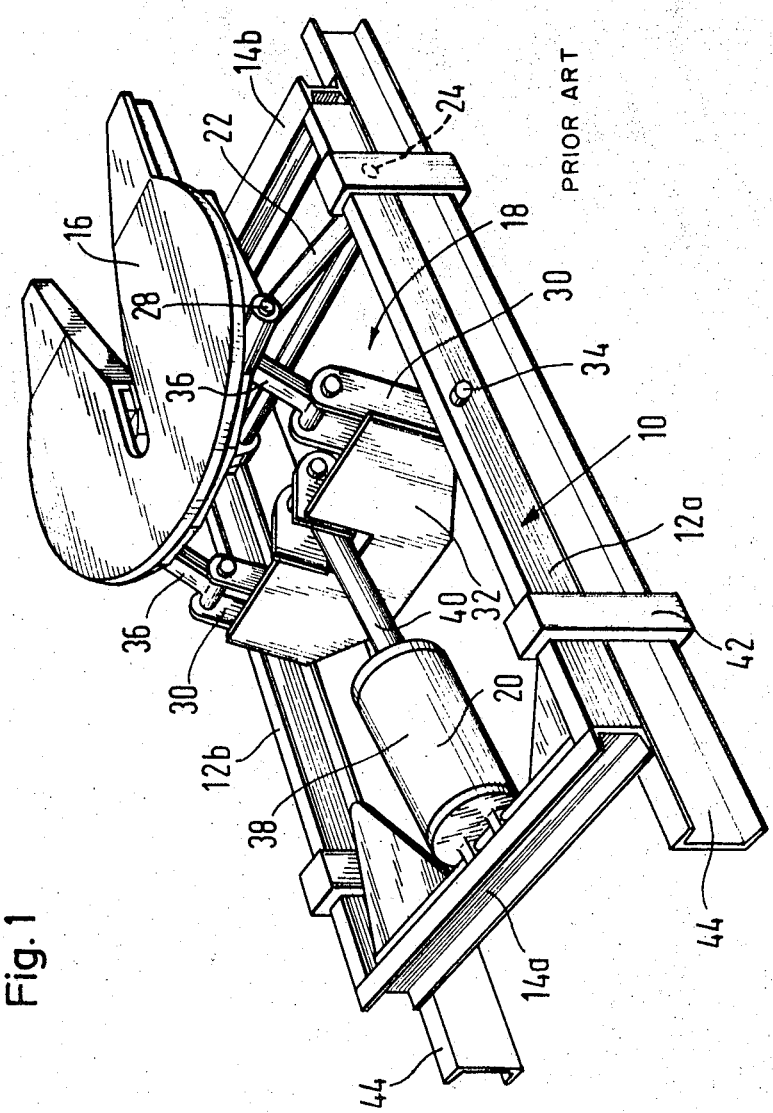
FIG. 1 shows a fifth wheel unit as known in the art.

Referring now to the drawings in detail and initially to the known device seen in FIG. 1, there is shown a basic frame 10; this basic frame 10 comprises two longitudinal support members 12a and 12b extending in the normal direction of vehicle movement. These longitudinal support members 12a and 12b are connected by two transverse members 14a and 14b. A fifth wheel 16 is liftably mounted on the basic frame 10 by a lifting mechanism 18. The mechanism 18 is driven by a hydraulic unit 20. The mechanism includes a first group of radial arms 22 which are fixed to a common mounting shaft 24. The mounting shaft 24 is mounted in bearings of the longitudinal support members 12a, 12b. The other ends of the arms are pivotally connected to the fifth wheel 16 by a pivot shaft 28.

The mechanism further includes a second group of arms 30 which are connected by a plate 32 and are mounted on a further mounting shaft 34; said further mounting shaft 34 is equally mounted in the longitudinal support members 12a, 12b.

Links 36 are connected to the free ends of the arms 30. The links 36 are also pivotally connected to the fifth wheel 16 by the pivot shaft 28.

The hydraulic unit 20 comprises a cylinder 38 which is pivotally mounted to the transverse member 14a and a piston rod 40 which is pivotally connected to the plate 32. By contraction and expansion of the hydraulic unit 20 the height of the plate 16 over the frame 10 can be varied.

The longitudinal support members 12a, 12b are fixed by mounting brackets 42 to the longitudinal supporting beams 44 of a semitrailer truck.

In the embodiment of the invention seen in FIGS. 2 and 3, there are again shown the longitudinal support beams 44 of the semitrailer truck together with the cab 46 and the wheels 48 of the semitrailer truck. On the longitudinal supporting beams 44 there is mounted a basic frame 50. This basic frame 50 comprises longitudinal support member 52 and transverse members 54, 56. The support members 52 are fixed by mounting brackets 58 to the longitudinal supporting beams 44 of the truck.

The connecting means between the longitudinal support members 52 and the transverse members 54, 56 are substantially identical; they are designated by the reference numeral 60. These connecting means each include two parallel connection plates 62; in each of these parallel connection plates 62 there is provided a straight row of bores 64. At the corresponding end of the longitudinal support member 52 there is provided a connection eye 66 which shows also a bore 68. A pin or connection member 70 engages respective aligned bores 64 of the connection plates 62 and the bore 68 of the eye 66. The connection member 70 can be released so that the longitudinal support member can be connected to different bores 64 of the plates 62.

Figure 2:
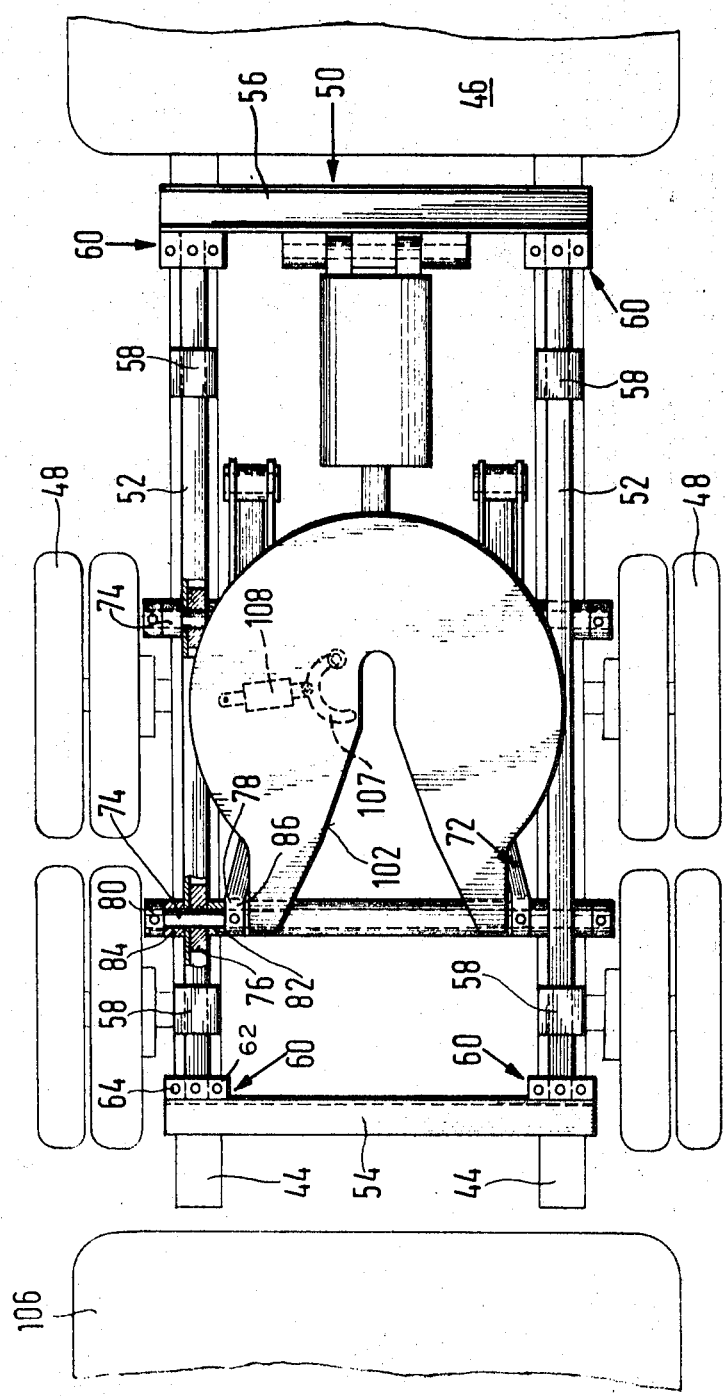
FIG. 2 shows a plan view of a fifth wheel unit according to this invention partially in section along lines A—A and B—B of FIG. 3.

On the basic frame 50 there is provided a lifting mechanism 72 which corresponds to the mechanism 18 described in connection with FIG. 1. The mechanism 72 comprises two mounting shafts 74. These mounting shafts must be also adapted to varying distances of the longitudinal support members 52. There is provided a bearing 76 in each of the longitudinal support members 52 for each of the mounting shafts 74. This bearing 76 is axially fixed with respect to the mounting shaft 74 by abutments 78 and 80. The abutment 80 is releasable. Between the abutment 78 and the bearing 76 there is provided an annular spacer 82. Between the abutment member 80 and the bearing 76 there is provided an annular spacer 84. Both spacers have the same axial length as the bearing 76 and this axial length corresponds to the distance of the bores 64 along the transverse member 54. If the longitudinal support member 52 is connected to the innermost of the bores 64 both spacers 82, 84 are on the outer side of the longitudinal support member 52. If the longitudinal support member 52 is connected to the middle bores the spacers 82 and 84 are, as shown in FIG. 2, on both sides of the bearing 76. If the longitudinal support member 52 is connected to the outermost bores 64 both spacers 82, 84 are on the inner side of the bearing 76.

As can be seen from FIG. 2 a first group of arms 86 is fixed to mounting shaft 74 on the one hand and to a shaft 88 of a fifth wheel 90 on the other hand. A second group of arms 92 is connected to the other mounting shaft 74 on the one hand and connected to links 94 on the other hand, said links 94 being also pivotally connected to the shaft 88 of the fifth wheel 90. A hydraulic unit 96 is pivotally connected to the transverse member 56 by its cylinder 98 and to arms 92 by its piston rod 100.

The fifth wheel shows a slot 102 into which a kingpin 104 of a semitrailer 106 can be inserted for coupling the two vehicles. If the kingpin 104 is inserted into the slot 102 a lock member 107 can be brought into a closing position in which it connects the kingpin and the fifth wheel unit. A locking mechanism 108 operates the lock member 107.

In the embodiment of FIGS. 4 and 5 there is provided a basic frame 110 with two longitudinal members 112. These longitudinal members 112 are connected by transverse members 114, 116, 118. The connections between the transverse members and the longitudinal members are constructed as shown in FIGS. 2 and 3. The principal difference concerns the lifting mechanism.

Links 126 are pivotally connected at 124 to the transverse member 118 with their one ends and at 128 to the fifth wheel 130.

A linking plate 132 is pivoted at 134 to the longitudinal support members 112 and at 136 to piston rods 138 of a twin hydraulic unit 140 whose cylinders 142 are pivoted at 144 to the transverse member 116. A third group of links 146 connect the pivot shaft 136 of the links 132 and the piston rods 138 with the shaft 128 of the fifth wheel 130.

It is to be noted that only the bearings at 134 are to be adapted to varying distances of the longitudinal support members 112. All the other bearings of the transverse shafts are mounted in transverse members so that the position of their bearings is not influenced by varying the distance of the longitudinal support members 112.

What I claim is:

1. In a fifth wheel unit for coupling two vehicles, the unit including a basic frame having two longitudinal support members, two transverse members, and a plurality of connecting means connecting respective portions of said longitudinal members and of said transverse members, a fifth wheel, lifting means securing said fifth wheel to said frame for adjusting the height of said fifth wheel above said frame, and mounting means for mounting said longitudinal members on respective supporting elements of one of said vehicles in respective positions in which said longitudinal members extend in the normal direction of movement of said one vehicle, the improvement in each connecting means which comprises:

(a) a connecting member on said portion of the longitudinal member; and
   (b) the portion of the transverse members associated with said portion of the longitudinal member being shaped conformingly to receive said connecting member in each of a plurality of locations spaced transversely of said direction.

2. In a fifth wheel unit as set forth in claim 1 said lifting means including a mounting shaft substantially parallel to said transverse members, said mounting shaft being mounted on bearing means of said longitudinal support members, said bearing means being adjustable along said mounting shaft.

3. In a fifth wheel unit as set forth in claim 2 said mounting shaft being axially fixed with respect to one of said longitudinal support members by one inner and one outer abutment member, a spacer member releasably inserted between said bearing means and one of said abutment members, one of said abutment members being releasably fixed to said mounting shaft.

4. In a fifth wheel unit as set forth in claim 3 said inner abutment member being an element of said lifting means and said outer abutment member being releasable.

5. In a fifth wheel unit as set forth in claim 3 said spacer member being annular surrounding said mounting shaft.

6. In a fifth wheel unit as set forth in claim 3 said spacer member having the same axial width as said bearing means.

7. In a fifth wheel unit as set forth in claim 1, said longitudinal member being formed with a bore, said transverse member being formed with a plurality of bores jointly constituting a transversely extending row, said connecting member simultaneously engaging said bore in the longitudinal member and one bore of said row, and being shaped for engagement with all other bores of said row respectively while engaging the bores of the longitudinal member.

8. In a fifth wheel unit as set forth in claim 7, said portion of the transverse member including two spaced plate parts receiving said portion of the longitudinal member therebetween, one of said plate parts being formed with said row of bores, the other plate being formed with a corresponding row of bores respectively aligned with the bores of said first-named row, said connecting member simultaneously engaging respective bores of said two plate parts and of said portion of the longitudinal member.

References Cited
UNITED STATES PATENTS

| | | | |
|---|---|---|---|
| 1,889,520 | 11/1932 | Anthony | 298—22[RC] |
| 2,510,814 | 6/1950 | Golay | 298—22[RC] |
| 2,515,575 | 7/1950 | Van Langen | 280—425 |
| 2,640,725 | 6/1953 | Dale | 298—22 |
| 2,928,684 | 3/1960 | Geiger | 280—425 |

FOREIGN PATENTS

| | | | |
|---|---|---|---|
| 492,625 | 5/1953 | Canada | 298—22P |

LEO FRIAGLIA, Primary Examiner

U.S. Cl. X.R.

298—22